March 12, 1968     J. A. DORR ET AL     3,373,399

SONAR BOTTOM TRACKING RECORDING SYSTEM

Filed Jan. 20, 1966

INVENTORS
John A. Dorr and
Melvin L. Hiller.

BY *[signature]*

ATTORNEY

United States Patent Office 3,373,399
Patented Mar. 12, 1968

3,373,399
SONAR BOTTOM TRACKING
RECORDING SYSTEM
John A. Dorr, Baltimore, and Melvin L. Hiller, Annapolis, Md., assignors to Westinghouse Electric Corporation, Pittsburgh, Pa., a corporation of Pennsylvania
Filed Jan. 20, 1966, Ser. No. 521,912
4 Claims. (Cl. 340—3)

ABSTRACT OF THE DISCLOSURE

Sonar signals are successively transmitted toward the ocean bottom to obtain a profile display on a paper recorder having a rotating drum. A code wheel connected to the drum provides a digital representation of depth. When a point of interest on the display is encountered a manually operated switch is closed allowing the code wheel to be read out by a return signal thereby providing a corresponding digital representation of depth.

In another display a cathode ray storage tube is utilized in conjunction with a counter which provides a running digital representation of depth.

This invention in general relates to sonar tracking systems, and more particularly to a system for displaying and digitally recording ocean depth.

Frequently in oceanographic studies it is desired to know the depth of the ocean bottom in an area under survey. Generally, this is accomplished by having the oceanographic vessel travel along a traverse and during which period of travel, acoustic signals are successively transmitted toward the ocean bottom. The corresponding return acoustic signals are visualy displayed in a device such as a direct view storage tube or a paper recorded. Since there is a vast amount of data to be correlated, each bit of information in the oceanographic study is converted into an equivalent digital form for use by a computer. Depth information is read off from the display by an operator and is then manually set, by means of a plurality of switches, into digital form for input to a computer or for recording on tape. With this technique errors can be made in reading the display or in setting the switches. In addition, readings and recording of readings cannot be undertaken in a fast enough time, even with a skilled operator.

It is therefore a primary object of the present invention to provide a sonar mapping system which allows digital recording of bottom depth without the introduction of errors.

A further object is to provide a system in which digital storage may take place concurrently with the display of the return acoustic signals.

Another object is to provide such a system which is extremely simple and eliminates the need for a highly skilled operator.

Briefly in accordance with the above objects, successive acoustic signals are transmitted toward the ocean bottom, or the bed of any body of water, whereupon corresponding return acoustic signals are generated, in a well known and well used manner. Receiver means are provided to produce corresponding output signals as the return acoustic signals are received.

A display means is responsive to the corresponding output signals for providing a visual display, in profile, of the ocean bottom. As the output signals are being displayed, a digital representation thereof is concurrently being provided in timed relationship with the display device. Circuit means including a manually operated gating device effects a read-out of the digital representation of depth when a region of interest is encountered on the display, by the operator.

Threshold means may be provided so that the digital read-out is effected only when a return acoustic signal is above a predetermined threshold level so that to record a strong depth signal, such as from the ocean bed, the operator need only to look at the profile display being presented and operate the gate approximately when a bottom signal is going to be displayed.

The above stated, as well as further objects and advantages, will become apparent upon a reading of the following detailed specification taken in conjunction with the drawings, in which.

Figure 1:
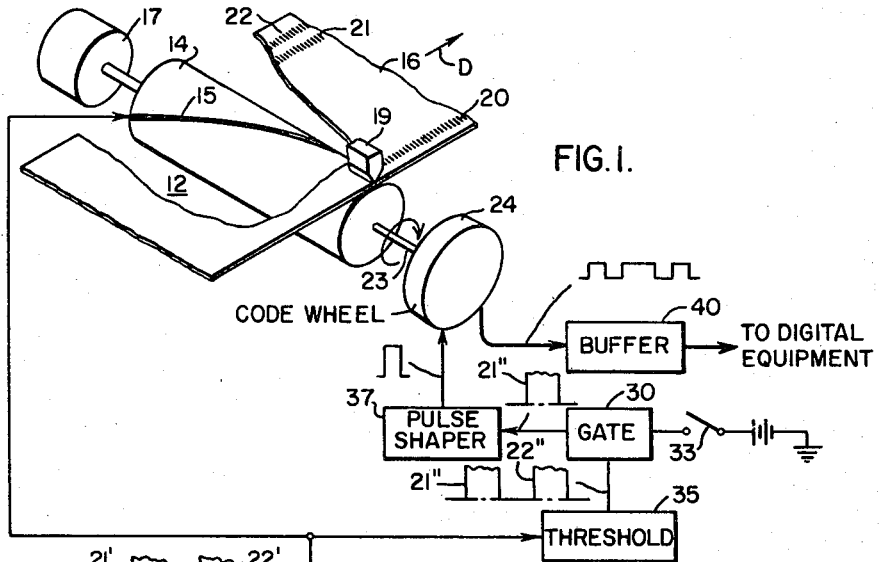
FIG. 1 illustrates apparatus according to the present invention.

Referring now to FIG. 1, there is shown a sonar mapping system including a conventional transmitter 8 for periodically projecting sonar signals toward the ocean bottom whereupon corresponding return acoustic signals are generated. The return signals are detected in the receiver 10 which then provides output signals in accordance with these return acoustic signals.

Display means 12 is provided for presenting a graphic representation of the ocean bottom profile in accordance with the output signals provided by receiver 10. The display means 12 illustrated in FIG. 1 is a conventional wire drum-paper recorder which includes a rotating drum 14 upon which is located a conductor in the form of wire 15 wound as a one-turn helix on the drum.

Motor 17 rotates the drum 14 at a certain speed which is dependent upon the depth range under investigation.

The recorded paper 16 passes over the rotating drum 14 in the direction of the arrow D. The recorder paper 16 is of the variety which discolors upon the application of electric energy so that when wire 15 is provided with an output signal from the receiver 10 a small mark will be made on the paper.

As the recorded paper 16 passes over the rotating drum 14 the output signals from receiver 10 are supplied to the wire 15, pass through the recorder paper 16, to the electrode bar 19, partially shown but which, in actuality, extends the length of the drum 14 so that as the drum rotates the point of registration between the wire 15 and the electrode bar 19 travels across the paper and, in actuality, may be analogized to the actual sonar signal being projected toward the ocean bottom. When provided with an output signal from the receiver 10, the display device will make a mark on the recorder paper 16. A series of marks is illustrated at 20, 21 and 22. The series of marks 20 is representative of zero distance; that is, the surface, and is obtained by the transmitter 8 providing a signal to the wire 15 upon each acoustic transmission.

Figure 2:
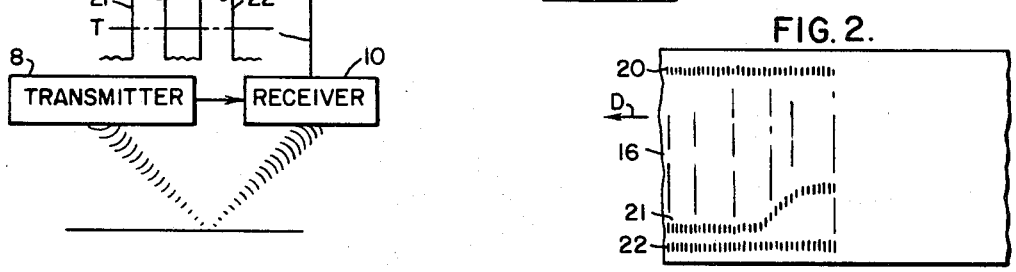
FIG. 2 illustrates a typical bottom mapping display.

The recorder paper is shown in more detail in FIG. 2. Below the series of marks 20 representing the surface is a series of marks 21 indicative of the ocean bottom in profile, and the series of marks 22 below that may represent, for example, a subsurface strata of some kind. Random marks between 20 and 21 may be due to extraneous noise, fish, schools of fish, or the like. An operator looking at the recorder paper is able to see the position of the wire 15 with respect to the recorder paper 16 and can easily see, after a mark in the 20 series, when the next mark in the 21 series should occur.

As the oceanographic vessel travels along a course line, the contour of the ocean bottom (represented by the series of marks 21) is built up. At various points along the traverse it is desired that the depth of the bottom at certain ship positions be digitally recorded for computer correlation. In FIG. 1 the rotating drum 14 is coupled by means of shaft 23 to the code wheel 24 which provides a digital representation of shaft angle. Since the rotation of drum 14, and consequently the shaft angle determines the point of registry between the wire 15 and the electrode 19, and this in turn is equivalent to depth, the code wheel 24 may be calibrated directly in terms of depth. In other words, in any point in time the code wheel 24 is providing a digital representation of depth as the output signals are being displayed and as the drum 14 rotates. For different ranges of depth, different suitably calibrated code wheels may be utilized.

The apparatus of FIG. 1 includes means under the control of an operator for effecting a read-out of the digital information stored in the code wheel 24. More specifically, a gate circuit 30 is operable to either pass or not pass signals provided to it, depending upon whether the manually operable switch 33 is closed or opened.

The signals provided to the gate 30 originate at the receiver 10 and, by way of example, two signals 21' and 22', corresponding to a mark in the 21 series and 22 series, respectively, are illustrated. In order to insure that spurious or weak signals do not cause a read-out of the code wheel 24 there is provided a threshold circuit 35 which will provide output signals, such as 21" and 22", only if the input signals 21' and 22' are above a certain threshold level T. If it is desired to digitally record ocean bottom depth, the operator looks at the display and closes the switch 33 just prior to the time when the next mark in the 21 series will be provided. This operation passes the signal 21' to the pulse shaper 37 which provides an output pulse to interrogate the code wheel 24 and to cause a read-out of the digital information into the buffer 40 for transfer to a digital computer or recording tape.

If it is also desired to record the depth of strata represented by the marks 22, the operator may leave the switch 33 depressed so that the signal 22" will also be passed through the gate 30. If only bottom depth is required, the operator will open the switch 33 after the mark in the 21 series has been provided. Thus, when a region of interest on the display is encountered, the operator need only to manually depress switch 33 whereupon any return signal above a threshold level T, such as a bottom echo, will cause a read-out of the code wheel and the transformer or storage of the digital representation of depth.

Figure 3:
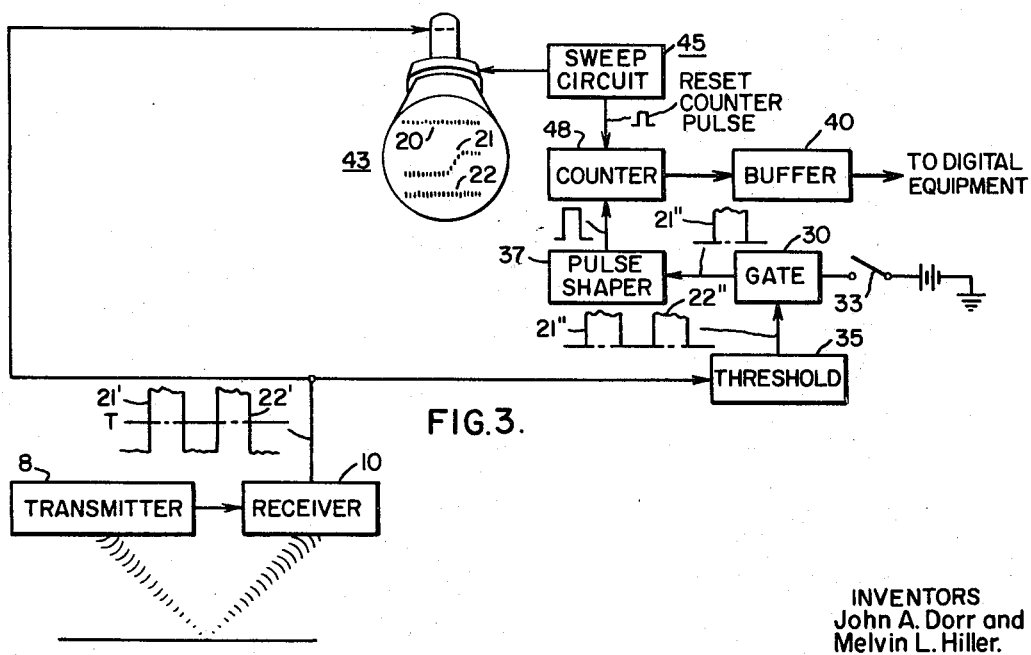
FIG. 3 illustrates another embodiment of the present invention.

FIGURE 3 illustrates a modification of the apparatus wherein an electronic display is provided. Components similar to those in FIG. 1 have been given like reference numerals. In FIG. 3 the display means includes a cathode ray tube in the form of a direct view storage tube 43 which has a vertically scanning cathode ray electron beam under the control of sweep circuit 45. The intensity of the electron beam is controlled by the output of the receiver 10 connected to the grid electrode of the storage tube 43, and each vertical trace of the cathode ray beam will produce a mark in the 20 series, a mark in the 21 series representing the ocean bottom, and a mark in the 22 series representing the first strata. It is seen, therefore, that the vertical position of the cathode ray beam is a representation of depth as the cathode ray beam goes through a vertical trace, counter 48 provides a corresponding digital representation of depth and when the end of a vertical trace is reached, the sweep circuit 45 may provide a pulse to reset the counter 48 to start the count over again with the next transmitted acoustic signal. The read-out of the counter 48 is effected by manually depressing the switch 33 when a region of interest in the display is encountered, so that received signals above a certain threshold will be passed by the gate circuit 30. In this respect, the grid of the storage tube 43 would probably have a low level bias signal applied to it so that a faint trace may at all times be seen on the face of the storage tube. Alternatively, if only the depth of the layer represented by the marks 22 is to be recorded, the operator may depress the switch 33 after a mark in the 21 series has been provided.

Although the present invention has been described with a certain degree of particularity, it should be understood that the present disclosure has been made by way of example and that numerous changes in the details of construction and the combination and arrangement of parts may be resorted to without departing from the scope and spirit of the invention.

What is claimed is:
1. Apparatus for a sonar mapping system wherein acoustic signals are successively transmitted toward the bed of a body of water, along a transverse, whereupon corresponding return acoustic signals are generated, comprising:
  (A) receiver means responsive to return acoustic signals for providing corresponding output signals;
  (B) display means responsive to said output signals for providing a visual display thereof;
  (C) first means for providing a digital representation of depth, as said output signals are being displayed; and
  (D) second means including
    (1) a threshold circuit for passing only output signals that are above a certain threshold level,
    (2) a gate circuit which is closeable by an operator, for gating the signals provided by said threshold circuit,
      (a) the gated signals effecting a read-out of said first means.

2. Apparatus for a sonar mapping system wherein acoustic signals are successively transmitted toward the bed of a body of water, along a traverse, whereupon corresponding return acoustic signals are generated, comprising:
  (A) receiver means responsive to return acoustic signals for providing corresponding output signals;
  (B) display means of the type wherein recorded paper relatively travels past a rotating drum having a helical conductor thereon;
  (C) an analog to digital converter means responsive to the angular position of said rotating drum for providing a corresponding and functionally related digital output signal;
  (D) circuit means under the control of an operator for effecting a read-out of said digital representation when a region of interest on said display is encountered, as said display is being provided.

3. Apparatus according to claim 2 wherein:
  (A) the analog to digital converter is a code wheel with a shaft interconnecting the rotating drum and the code wheel; and wherein
  (B) the code wheel is calibrated directly in terms of depth.

4. Apparatus for a sonar mapping system wherein acoustic signals are successively transmitted toward the bed of a body of water, along a traverse, whereupon corresponding return acoustic signals are generated, comprising:
  (A) receiver means responsive to return acoustic signals for providing corresponding output signals;

(B) display means including a cathode ray storage tube;
(C) a digital counter for providing a digital representation of depth, as said output signals are being displayed;
(D) the cathode ray beam of said storage tube being controlled by a sweep circuit;
(E) said digital counter being connected to be reset by said sweep circuit upon each new scan of the cathode ray beam; and
(F) circuit means under the control of an operator for effecting a read-out of said digital representation when a region of interest on said display is encountered, as said display is being provided.

References Cited

UNITED STATES PATENTS 3,181,154   4/1965   Henne _____ 340—3 X
3,195,103   7/1965   Drenkelfort _____ 340—3

RICHARD A. FARLEY, *Primary Examiner.*